(No Model.)

G. STEINSON.
SPRING BED BOTTOM.

No. 357,795. Patented Feb. 15, 1887.

WITNESSES:
C. Neveux
C. Sedgwick

INVENTOR:
G. Steinson
BY Munn & Co.
ATTORNEYS.

UNITED STATES PATENT OFFICE.

GEORGE STEINSON, OF GUTTENBERG, NEW JERSEY.

SPRING BED-BOTTOM.

SPECIFICATION forming part of Letters Patent No. 357,795, dated February 15, 1887.

Application filed March 16, 1886. Serial No. 195,432. (No model.)

*To all whom it may concern:*

Be it known that I, GEORGE STEINSON, of Guttenberg, in the county of Hudson and State of New Jersey, have invented a new and Improved Spring Bed-Bottom, of which the following is a full, clear, and exact description.

My invention relates to a spring bed-bottom composed of a net-work of coiled wire springs connected to a suitable frame; and the invention consists, principally, in combining shackles with the springs, to prevent the same from being too far distended by heavy weight upon the bed, thus preventing the springs from injury and from being broken.

The invention also consists in forming the springs with hooks or loops at each end to connect with chain-shackles; also, of a metal coupling formed with headed arms to connect the chains to form the net-work and to connect the net-work to the frame.

The invention further consists of the means employed for connecting the net-work to the frame of the bed; and the invention finally consists of the construction, arrangement, and combination of parts, all as hereinafter described and claimed.

Reference is to be had to the accompanying drawings, forming a part of this specification, in which similar letters of reference indicate corresponding parts in all the figures.

Figure 1:
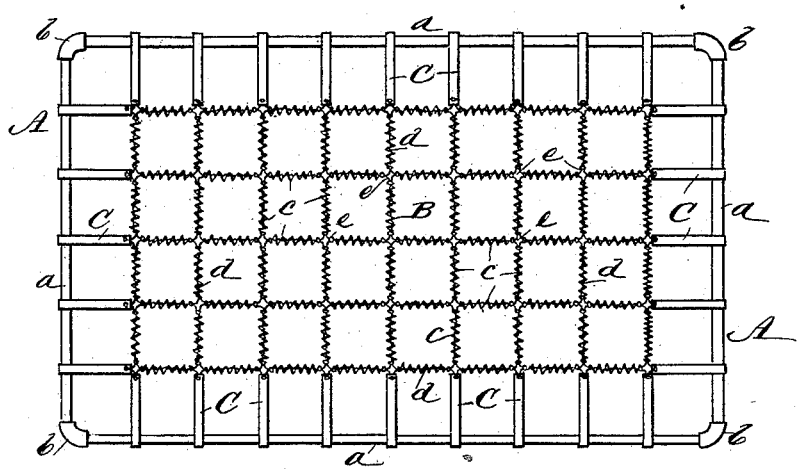
Figure 1:
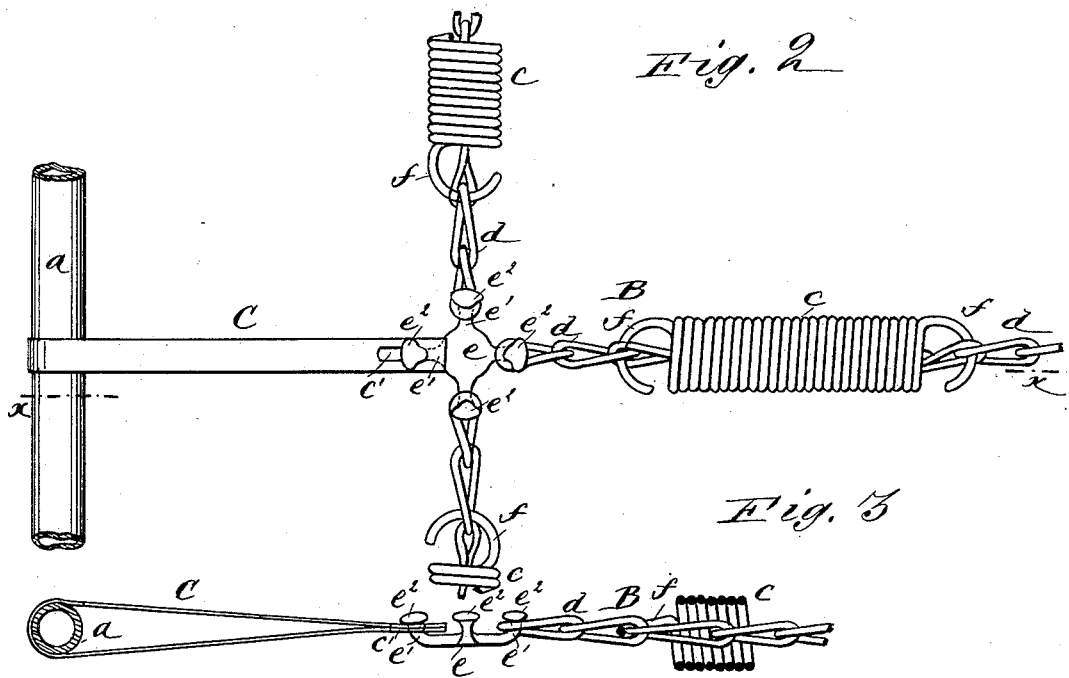

Figure 1 is a plan view of my new and improved bed-bottom complete. Fig. 2 is an enlarged detailed view showing the construction and the combination of the springs; and Fig. 3 is a sectional elevation of the same, taken on the line $x\ x$ of Fig. 2.

A represents the frame of the bed, and B the elastic net-work attached to the frame A by the metal straps C C. The frame A is, by preference, composed of four metal pipes, $a$, joined at their ends by the corner elbow-couplings, $b\ b$, forming a rectangular frame.

The net-work B is composed of the coiled spring $c$ and linked connections or short chains $d$, that shackle the springs and prevent them from being distended too far. The chains $d$ are connected together and to the frame A by the coupling-pieces $e$ and the said metal straps C.

In order that the coils $c$ shall be shackled by the chains $d$, I connect the ends of the springs in the links of the chains by the end hooks, $f$, and pass the chain through the springs, giving some slack to the chain, which will permit each coil to distend the length of the slack and no more, as the chains will then become taut and take the strain off from the springs. In this manner the springs are prevented from injury, no matter how much weight the bed-bottom may be required to support.

The coupling-pieces $e$ are preferably of malleable cast-iron and each formed with a central body and upwardly-projecting arms $e'$, (four or more in number,) and the arms $e'$ are each formed with a head or plate portion, $e^2$, constructed to form a toggle-connection with the links of the chains $d$ and also (the outer ones in the net-work) with the metal straps C, the same being slotted near their extremities, as shown at $c'$, to receive the plate or head portions $e^2$ of the arms, as shown clearly in Figs. 2 and 3.

By detaching one end of each metal strap C from the couplers $e$ the net-work may be easily detached from the frame A, and as easily replaced by passing the straps over the bars of the frame and connecting them with the couplings $e$.

Constructed in the manner described the bed-bottom is not only cheap and practical, but is much more durable than the ordinary form of bed-bottoms, and its elasticity when occupied will be practically uniform throughout the whole net-work B.

Having thus fully described my invention, I claim as new and desire to secure by Letters Patent—

1. The short chains $d$, connected together by the coupling-pieces $e$ to form a net-work connected to the frame A by the straps C, also connected to the coupling-pieces $e$, in combination with the coiled springs $c$, one placed upon each short chain and connected at both ends to the chain, so that normally the chains will be held slack within the springs, substantially as described.

2. The coupling $e$, formed of a solid central body having upwardly and outwardly projecting arms $e'$, formed with flattened heads $e^2$, to receive the links of the chains, and the connecting-straps C, substantially as described.

GEORGE STEINSON.

Witnesses:
H. A. WEST,
C. SEDGWICK.